July 18, 1950  E. P. DRAKE  2,515,442
CALCULATING MACHINE

Original Filed Nov. 6, 1946  8 Sheets-Sheet 1

FIG.1.

INVENTOR.
EDWARD P. DRAKE
BY

ATTORNEY

July 18, 1950  E. P. DRAKE  2,515,442
CALCULATING MACHINE
Original Filed Nov. 6, 1946  8 Sheets-Sheet 5

INVENTOR.
EDWARD P. DRAKE
BY
Fred N. Schwend
ATTORNEY

July 18, 1950     E. P. DRAKE     2,515,442
CALCULATING MACHINE Original Filed Nov. 6, 1946     8 Sheets-Sheet 6

INVENTOR.
EDWARD P. DRAKE
BY
ATTORNEY

July 18, 1950 E. P. DRAKE 2,515,442
CALCULATING MACHINE

Original Filed Nov. 6, 1946 8 Sheets-Sheet 7

INVENTOR.
EDWARD P. DRAKE
BY
ATTORNEY

July 18, 1950 E. P. DRAKE 2,515,442
CALCULATING MACHINE

Original Filed Nov. 6, 1946 8 Sheets-Sheet 8

INVENTOR.
EDWARD P. DRAKE
BY
Fred M. Schwend
ATTORNEY

Patented July 18, 1950

2,515,442

UNITED STATES PATENT OFFICE 2,515,442

CALCULATING MACHINE

Edward P. Drake, Glendale, Calif., assignor to Clary Multiplier Corporation, San Gabriel, Calif., a corporation of California Original application November 6, 1946, Serial No. 710,880. Divided and this application August 5, 1949, Serial No. 108,843

14 Claims. (Cl. 235—61)

1

This invention relates to transmission mechanism and has particular reference to mechanism for selectively transmitting motion between two geared elements, such as rack gears or a rack gear and a rotatable gear.

The invention has particular application to calculating machines of the reciprocating type which comprise reciprocating elements including rack gears, or rack gear sections, for transmitting motion from one operating or computing unit to another.

One object of the present invention is to selectively effect a driving connection between two rack gears, one movable at an angle relative to the other.

Another object of the invention is to selectively return one of the aforementioned rack gears to an initial position independent of the other.

Another object is to selectively effect a driving connection between a rack gear and a rotatable gear.

Another object is to provide a transmission mechanism for selectively effecting a driving connection between two gear elements in which the driving connection is effected by motion of a gear meshing with one gear element and rolling into mesh with the second element.

A still further object is to facilitate entry of a factor into a calculating unit of a calculating machine of the reciprocating or rack driven type.

The manner in which the above and other objects of the invention are accomplished will be readily understood on reference to the following specification when read in conjunction with the accompanying drawings, wherein.

2

This application is a division of the copending R. E. Boyden and E. P. Drake application, Serial No. 710,880, filed Nov. 6, 1946. Reference is therefore made to said application for a complete disclosure of a calculating machine in which the present invention is embodied. It should be understood, however, that the invention may be equally well embodied in other forms of calculating machines.

Since the machine, in which the present invention is embodied in its preferred form, is disclosed in detail in the aforementioned application, only a brief description of the operation of the same will be made herein, and for the sake of brevity, only that mechanism which embodies the present invention or cooperates therewith will be described in detail.

Keyboard and racks

Figure 1:
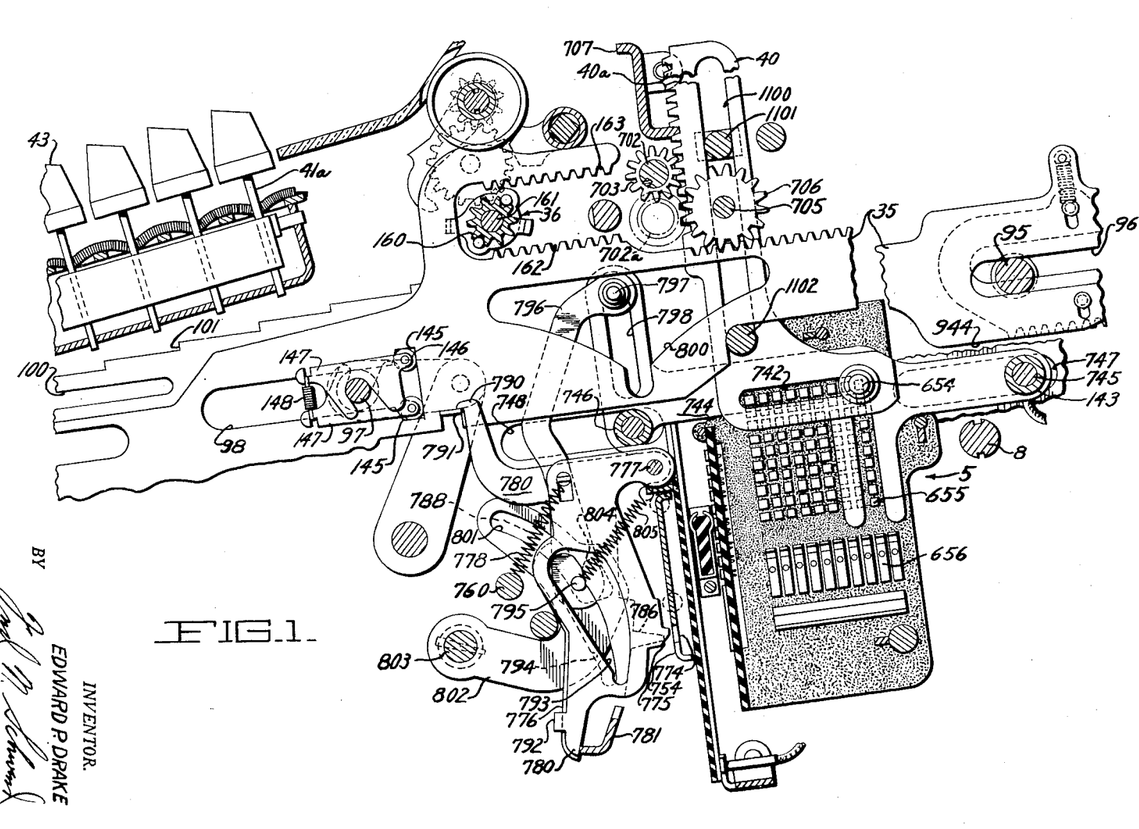
Fig. 1 is a longitudinal sectional view through a machine embodying a preferred form of the present invention.

The present machine is of the reciprocating rack type comprising a plurality of ordinally spaced differentially operable racks, one of which is shown at 35 (Fig. 1). Each rack is supported for fore and aft movement at the rear by a cross-shaft 95 embraced by an open slot 96 formed in the rack. At its forward end, each rack is supported by a rack drive shaft 97 suitably guided for fore and aft movement in slots, one of which is shown at 142 (Fig. 2) formed in machine side frames 143. The shaft 97 extends through and is movable along slots 98 formed in the various racks.

For the purpose of differentially controlling the extent of movement of the racks during entry of items into the machine, there is provided in operative relation to each rack, a series of keys, certain of which are indicated at 43, forming part of the keyboard. Each key 43 is depressible into a set position wherein a keystem 41a thereof is positioned to be engaged by a shoulder 101 of a rack stop bar 100 which, for the purpose of the present disclosure, may be considered as attached to its respective rack 35 in the position illustrated. The various shoulders 101 are spaced from their respective keystems 41a by increments corresponding in number to the values of the different keys.

The racks are utilized to transfer mechanical representations of values between different operating units of the machine, such as the aforementioned keyboard, an accumulator, generally indicated at 36, multiplying mechanism, generally indicated in part at 5, etc.

Drive

Power for the various mechanisms of the machine is obtained through a cyclically operable main clutch 7 (Fig. 3) and a cyclically operable multiplier clutch 9, the clutches being controlled by various ones of depressible control bars to be described later and by each other. The clutches are driven by a motor 420 having a worm 421 on the motor shaft thereof which meshes with a worm gear 422 rotatably mounted on a pivot shaft 423 and suitably fixed to a spur gear 424. The latter meshes with a main clutch driving gear 425, rotatably mounted on a main shaft 8, and a multiplier driving clutch 426 rotatably mounted on a multiplier shaft 10.

Figure 2:
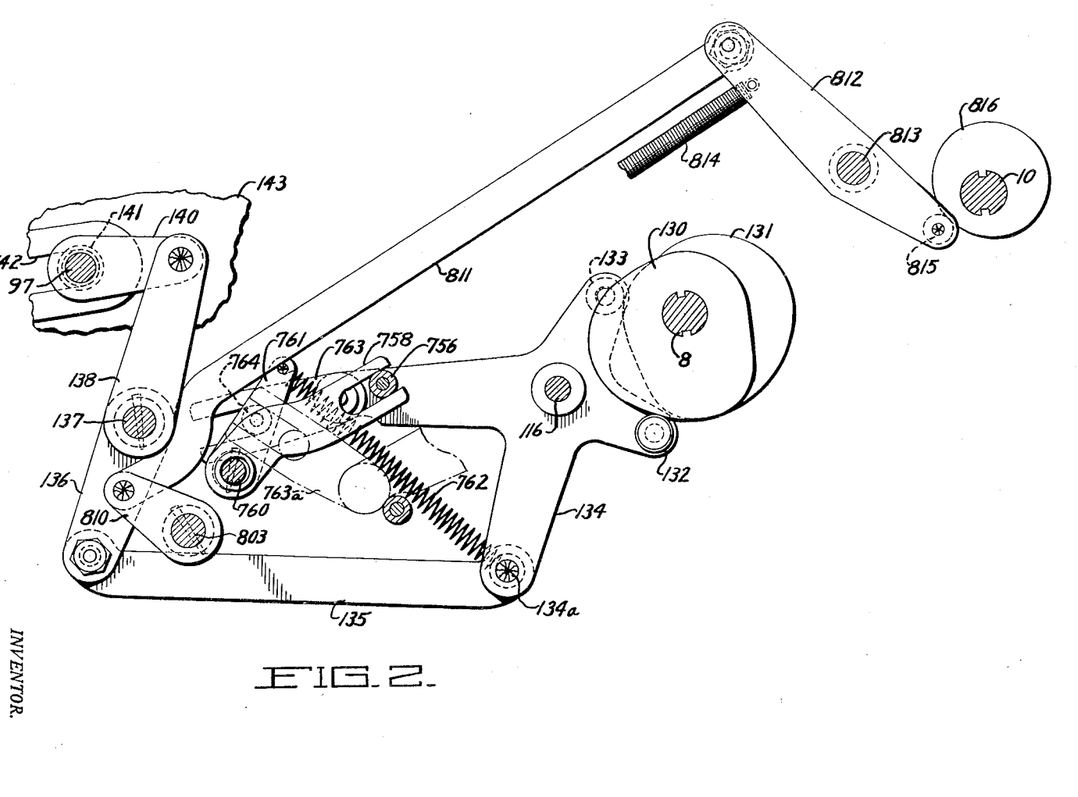
Fig. 2 is a side elevational view showing the mechanism for driving the main racks and for controlling the multiplier digit selecting mechanism.

Means are provided for yieldably transmitting a drive from the main shaft 8 to the racks 35 to differentially advance the latter under control of the amount keys 43. Referring to Fig. 2, a pair of complementary rack drive cams 130 and 131 are keyed to the aforementioned shaft 8 and are engaged by rollers 132 and 133 of a cam follower 134. The latter is pivoted at 116 and is connected by a link 135 to an arm 136 fixed on a rockable shaft 137. Also secured to the shaft 137 are spaced arms 138 connected by links 140 to the aforementioned rack drive shaft 97.

The slot 98, in each of the drive racks 35, terminates at its rear in laterally opposed notches 145. The latter are normally engaged by rollers 146 carried on carriers 147 pivoted on the shaft 97. The two carriers 147 associated with any one rack are spring urged in opposite directions by a tension spring 148 extending therebetween to yieldably maintain the rollers 146 in engagement with the notches 145 to form a yieldable connection between the shaft 97 and each of the different racks 35. Thus, the carriers 147 and their rollers 146 will couple the racks to the rack drive shaft 97 until arrested by depressed keys whereupon the rollers will move out of the respective notches and along the edges of the slot 98. The foregoing yieldable rack drive mechanism is disclosed and claimed in the copending application of R. E. Boyden, S. N. 718,706, filed December 27, 1946.

Addition controls

Figure 5:
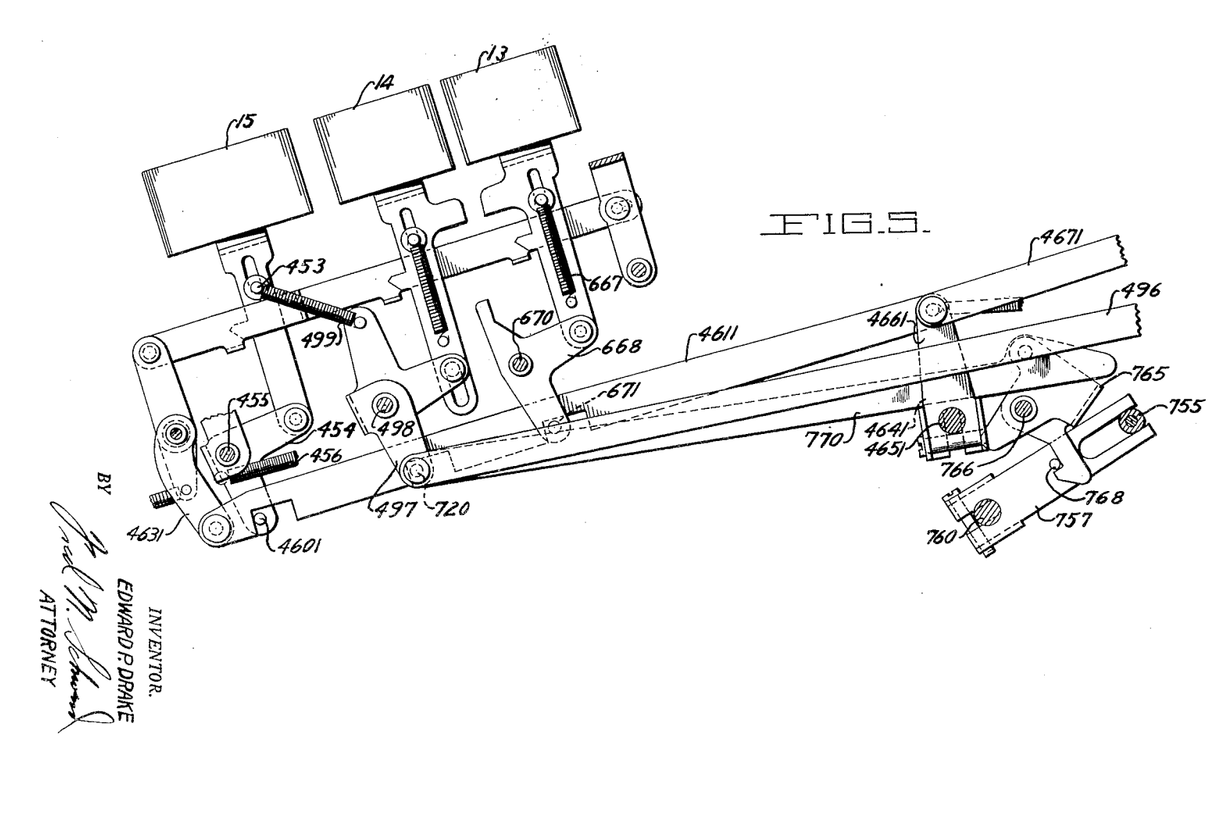
Fig. 5 is a side elevation illustrating part of the machine controls including the add and multiplication control bars.

In the operation of the machine to perform an additive entry of a factor into the accumulator 36, the factor is set into the keyboard by depressing appropriate ones of the keys 43 and an add bar 15 (Fig. 5) is depressed, causing operation of the machine and engagement of the main clutch 7 (Fig. 3) to operate through a complete cycle. Means (not shown) are also provided whereby depression of the add bar will cause the accumulator 36 to mesh with a rack gear section 162 on the rack 35. Referring to Fig. 5, the add bar 15 is provided with a vertical slot guided over a frame pin 453. The lower end of the stem is pivotally connected to a bellcrank 454, pivoted at 455, and urged counter-clockwise by a spring 456 to normally hold the add bar in its illustrated raised position. A pin 4601 on the lower arm of the bellcrank 454 extends within a notch in the clutch control bar 4611. The bar 4611 is supported for endwise movement by swinging arms 4631 and 4641, the latter being fastened to a rockable shaft 4651 to which is also attached a similar arm 4661 connected to the forward end of a clutch control bar 4671.

Figure 3:
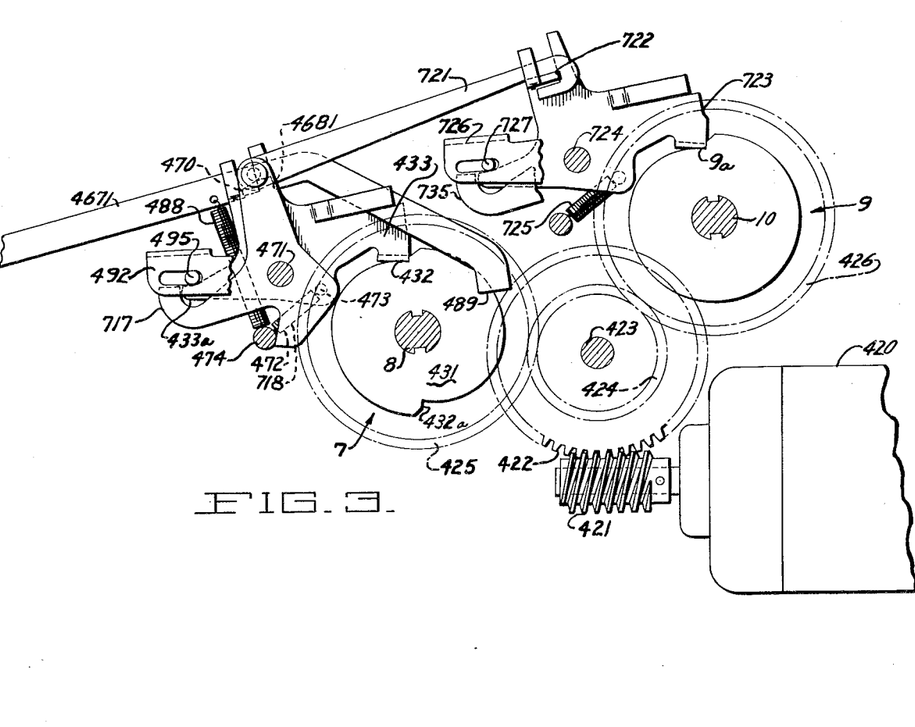
Fig. 3 is a side elevation illustrating part of the controls for the main and multiplier clutches, and the motor drive therefor.

Referring to Fig. 3, the link 4671 is provided with a notch 4681 normally embracing an ear 470 on a main clutch control lever 433. The latter is pivoted at 471 and is urged clockwise into engagement with the full cycle shoulder 432 on the main clutch 7 by a spring 472 to normally hold the clutch in disengaged condition. However, upon depression of the add bar and consequent forward movement of the bars 4611 and 4671, the clutch control lever 433 will be rocked counter-clockwise to cause engagement of the main clutch 7.

Figure 4:
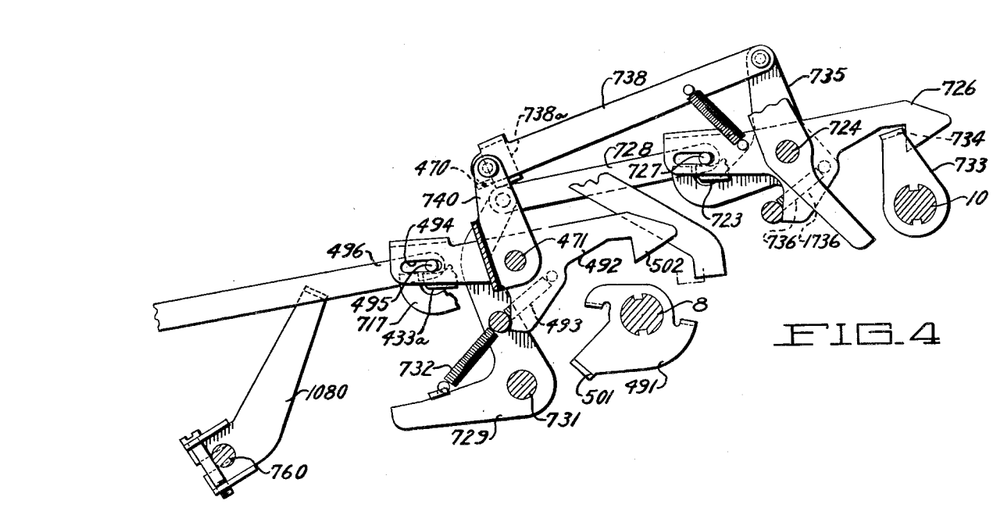
Fig. 4 is a side elevation illustrating further controls for the main and multiplier clutches.

It will be noted that there are two arresting shoulders 432 and 432a on the clutch 7, diametrically opposed to each other and each capable of being engaged by the lever 433 to arrest operation of the clutch 7. However, the shoulder 432a is ineffective to be arrested during addition operations, whereby to insure 360° of rotation of the shaft during such operations. For this purpose, a camming lever 492 (Fig. 4) is also pivoted at 471, independently of the clutch member 433, and is normally held in its illustrated position by a spring 493. A slot 494 is formed in the lever 492 to guide a pin 495 carried on a link 496 into either of two positions therealong. The latter is pivotally supported at its forward end by a bellcrank 497 (Fig. 5) pivoted at 498. The latter bellcrank is connected to a second factor control bar 14 and is normally held in a counter-clockwise illustrated position by spring 499 to maintain the pin 495 in its rearmost illustrated position along the slot 494 and to maintain the bar 14 in its illustrated raised position. During addition, the position of the link 496 is unaltered, thereby holding the pin 495 over a tail 433a of the clutch control lever 433.

Toward the mid-cycle or end of the first phase of the main clutch, a camming member 491, keyed on the main shaft 8, carries an ear 501 thereof against the camming edge 502 of the lever 492, thereby rocking the latter counter-clockwise to force the pin 495 to likewise rock the clutch control lever 433. Thus, the latter will be rocked outward away from the clutch 7 just as the shoulder 432a of the latter passes its mid-cycle position. Thereafter, the clutch will continue through the second half of its cycle and, at the end of that time, the clutch lever 433 will, under the action of its spring 472, engage the full cycle shoulder 432 of the clutch to disengage the same.

Multiplying mechanism

As disclosed in detail in said Boyden et al. application, multiplication is accomplished in the present machine by sequentially multiplying all digits of the multiplicand by each digit of the multiplier. This is accomplished electrically by adjusting ordinally arranged contact elements 654 (Fig. 1) in two directions with respect to coordinately arranged terminal contacts 655. The latter contacts are arranged in circuit (in a manner not shown) with different ones of a series of terminal strips 656 in accordance with the values of the partial products of the multiplication tables. The terminal strips 656 control differential actuating mechanism (not shown) which is operatively associated with a suitable accumulator arranged to receive and register the products of multiplication by different multiplier digits.

Figure 7:
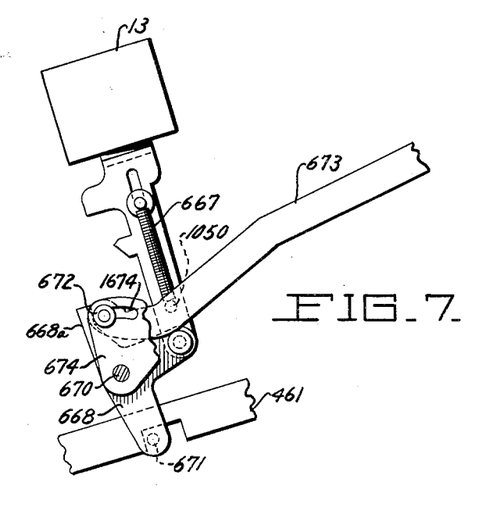
Fig. 7 is a side elevation showing the multiplicand entry bar and and linkage controlled thereby.

The multiplicand is entered into the machine by setting the same into the keyboard and depressing a multiplicand bar 13 (Figs. 5 and 7). The latter causes operation of the machine to vertically position the different contact elements 654 by amounts corresponding to the values of the different digits of the multiplicand factor. Thereafter, the multiplier is entered into the keyboard and a multiplier control bar 14 (Figs. 5 and 8) is depressed. The latter causes operation of the machine to advance the contact elements 654 fore or aft into alignment with a vertical row of terminal contacts 655 corresponding to a first selected digit of said multiplier factor. After multiplication in accordance with the first multiplier digit, all contact elements 654 are shifted fore or aft according to the value of the next succeeding multiplier digit, and so forth, until multiplication by all multiplier digits is completed.

*Multiplicand entering means*

Depression of the multiplicand bar 13 against the action of its spring 667, rocks a bellcrank 668 about its pivot 670, to carry a pin 671 in the lower end thereof against the forward end of an aligned notch in the aforementioned clutch control bar 4611 so as to actuate the latter and cause engagement with the main clutch 7 (Fig. 3) in the same manner as described in connection with the add bar 15.

In addition to causing engagement of the main clutch and operation of the machine, depression of the bar 13 effects the aforementioned vertical positioning of the contact elements 654 under control of the main racks 35. The bellcrank 668 is provided with a tail 668a effective to actuate a pin 672 mounted on the forward end of a link 673, the pin being guided in an arcuate slot 1674 formed in a lever 674 which, for the purpose of the present illustration, may be considered as being held stationary in the position illustrated in Fig. 7. Thus, depression of the bar 13 forces the link 673 rearward to carry therewith a cam slide 675 (Figs. 9, 11, 13 and 15) pivotally connected thereto. The latter is provided with elongated slots guided over stationary guide pins 676 and 677. However, the cam slide is normally held in its forward illustrated position by a spring 678 wherein a cam lobe 1680 thereon upholds a roller 680 mounted on a hook 681. The latter is pivoted at 683 to a slide 684 (also guided for fore and aft movement by pins 676 and 677) and is normally urged downward by a spring 685 extending between the hook and the latter slide. Thus, the lobe 1680, upon being removed from under the roller 680, allows the nose 688 on the hook 681 to engage a notch 686 (Figs. 9 and 17) in an aligned actuating slide 687 which is also guided for longitudinal movement on the pins 676 and 677.

Figure 17:
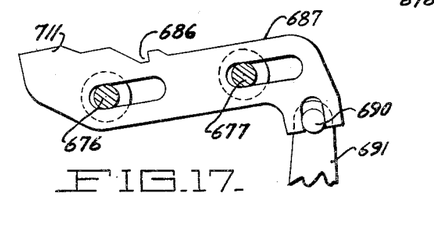

The slide 687 is reciprocated once during each main clutch cycle, and for this purpose, the link is connected to a cam follower 691 (Figs. 9, 10 and 17) pivoted on a frame stud 692 and provided with rollers 693 and 694 engaging the periphery of complementary cams 695 and 696, respectively, keyed on the main shaft 8.

When, upon depression of the multiplicand entry bar 13, the cam slide 675 is moved rearward to drop the hook 681 into location with the notch 686 in slide 687, the two slides 684 and 687 will be coupled together so that, during the ensuing clutch cycle, the cams 695 and 696 will reciprocate both slides. The slide 684 is connected through a pin and slot connection 697 to a rockable cam plate 698. The latter is fastened to one end of a rockable shaft 699 connected to a similar plate (not shown) on the opposite side of the machine. The cam plates and slide 684 are normally held in their rearward illustrated position by a spring 1677. Each of the cam plates (698) has a cam slot 700 formed therein embracing a roller 701 mounted on opposite ends of the shaft 702 (see also Fig. 12). The latter is guided for vertical movement in slots 704 carried in the stationary machine side frames 143. The cam slots 700 are arranged so that, as the cam plates 698 are rocked clockwise, the cam slots will lower the shaft 702.

The shaft 702 has rotatably mounted thereon a series of ordinally arranged gears 703 (Figs. 1 and 12) in continual mesh with vertically movable racks 40. The latter have slots 1100 therein slidable over fixed guide rods 1101 and 1102 and each of the racks is provided with a horizontally extending slot 742 embracing the associated contact element 654 whereby to carry the latter vertically when the rack 40 is likewise adjusted, as will be described presently.

Each of the main racks 35 is provided with a rack gear section in continual mesh with an associated idler 706, the latter being rotatably mounted on a stationary rod 705 and located in juxtaposition with an associated multiplicand rack 40. The diametrical pitch of the idlers 706 and teeth 40a of the racks 40 are the same, and the disposition of the gear teeth thereon is such that when these parts are in their illustrated home positions, the teeth of both the pinions 706 and the teeth 40a will be in alignment. Therefore, as the shaft 702 is moved downward to its alternate dot and dash line position 702a, the various pinions 703 thereon will roll downwardly along the teeth 40a into mesh with the idlers 706, thereby forming an operative connection between the main racks 35 and the multiplicand racks 40.

The above mentioned meshing operation occurs during the second half of a main clutch cycle, i. e., after the main racks 35 have been differentially advanced. Therefore, it is during the return movement of the racks 35 to their illustrated home positions that the multiplicand racks 40 will be differentially adjusted downwardly from their upper illustrated home positions by amounts corresponding to the values of the different multiplicand digits.

Figure 9:
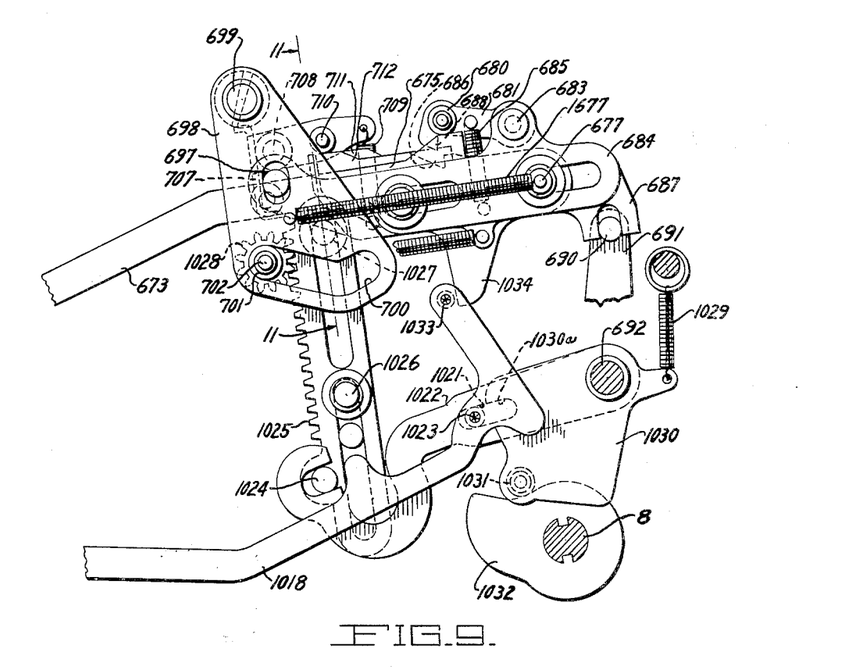
Fig. 9 is a side elevation showing devices for controlling the mechanism for entering and clearing multiplicand factors in and from the machine.
Figure 10:
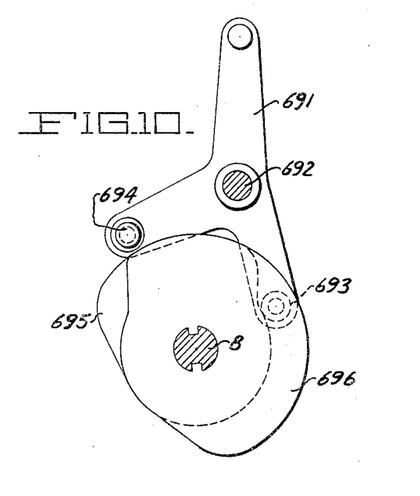
Fig. 10 is a detailed side elevation of the cam drive for operating the multiplicand and factor entry controls.
Figure 11:
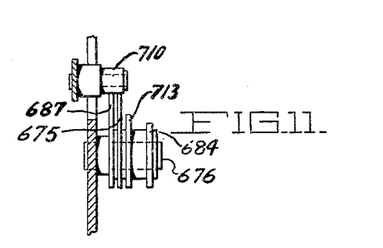
Fig. 11 is a transverse sectional view taken along the line 11—11 of Fig. 9.
Figure 12:
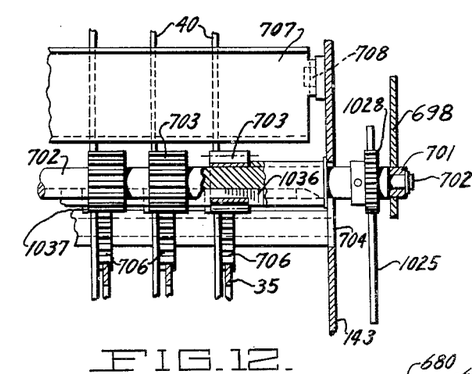
Fig. 12 is a front view, partly in section and partly broken away, showing the mechanism for coupling the main racks to the multiplicand racks for entering multiplier factors into the latter.
Figure 13:
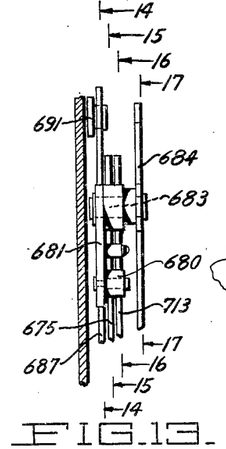
Fig. 13 is a sectional plan view of the multiplicand factor entering controls.
Figure 14:
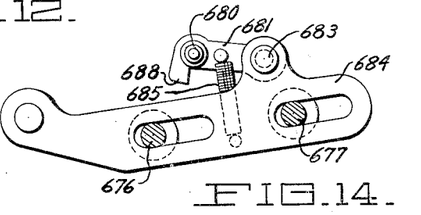
Figs. 14 to 17, inclusive, are detailed side elevational views taken along the lines 14—14 to 17—17, respectively, in Fig. 13.

Means are provided for locking the various multiplicand racks 40 in their home positions illustrated in Fig. 1 or in any other positions to which they may be adjusted. Referring to Figs. 1, 9 and 12, a rack lock bail 707 is pivotally supported on trunnion bearing 708 mounted in the machine side frames 143, and the bail is normally urged clockwise toward a position out of locking engagement with the teeth of the various racks 40 by a spring 709. A roller 710 is carried by the bail 707 and normally rests on cam lobes 711 and 712 formed on the previously described slide 687 and a second slide 713, respectively, both guided for longitudinal movement by the stationary pins 676 and 677.

Figure 15:
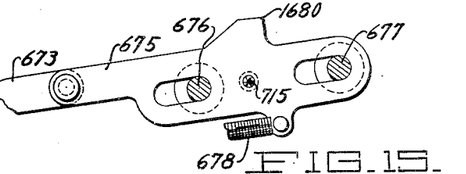

The slide 713 is urged toward the front of the machine by a spring 614 to maintain the rear edge of a guide slot therein against a stud 715 carried by the aforementioned slide 675 (Fig. 15). Therefore, at the start of the multiplicand entry operation, the rearward movement of the slide 675 effected by depression of the bar 13 will cause the stud 715 to force the link 713 rearward to remove the cam lobe 712 from below the roller 710 on the lock bail 707, leaving the latter to be supported solely by the slide 687. In the second half of the main clutch cycle during the multiplicand entry operation, the slide 687 will be moved forward, carrying the lobe 711 out from under the roller 710 so that the bail may be moved by its spring 709 out of locking engagement with the racks 40.

The lock bail 707 will remain out of engagement with the racks 40 until the end of the main clutch cycle, at which time the slide 687 under actuation by cams 695 and 696 (Fig. 10) will force the locking bail 707 into locking engagement with the racks 40 to hold them in their different adjusted positions.

Multiplier entering and multiplication control mechanism

Figure 8:
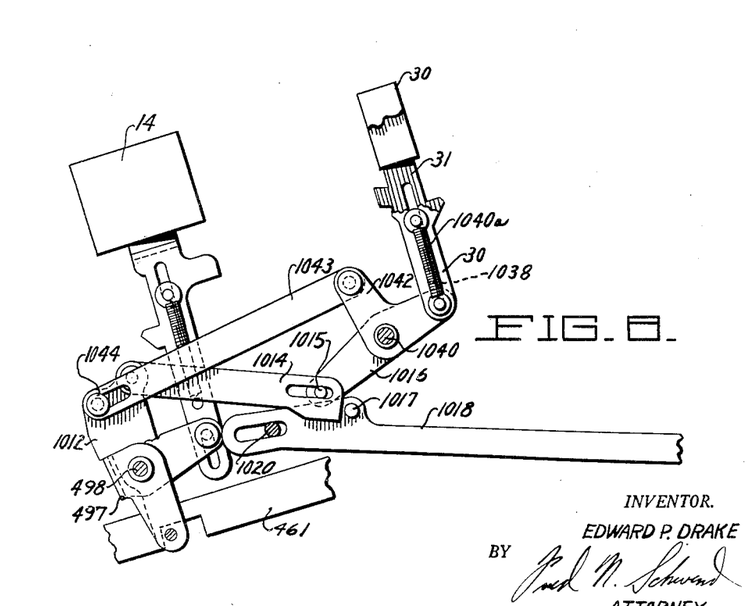
Fig. 8 is a side elevation showing the multiplier entry bar, the "clear multiplicand" bar and the "constant multiplicand" bar, and linkage controlled thereby.

The multiplier is entered into the machine by setting the factor into the keyboard and depressing the multiplier bar 14 (Figs. 5 and 8). The latter will initiate operation of the main clutch 7 (Fig. 3) and will condition the same to become disengaged at the end of its first phase or 180° of rotation and to initiate operation of the multiplier clutch 9 to cycle a number of times depending on the number of significant digits in the multiplier factor. At the completion of multiplication by all multiplier digits, the multiplier clutch 9 will become disengaged and will effect reengagement of the main clutch 7 to complete its second phase or 180° of rotation.

Referring to Fig. 5, depression of the multiplier bar 14 will rock bellcrank 497 about its pivot 498 to draw the aforementioned link 496 (see also Fig. 4) forward to move the pin 495 therein into a forward position wherein it overlies a bellcrank 717 (see also Fig. 3). The latter is pivoted at 471 independently of the lever 433 and is urged clockwise into its illustrated position by a spring 718. The bar 14 is held depressed through means (not shown) throughout the multiplication operation and therefore the pin 495 will be retained over the tail of the bellcrank 717 until the very end of such operation.

It will be noted on reference to Fig. 5 that the pivot pin 720 connecting the link 496 to the bellcrank 497 extends into a notch in the aforementioned clutch control bar 4611 so that as the bar 14 is depressed, the pin 720 will draw the clutch control bar forward to cause engagement of the main clutch in the same manner as described in connection with the add and multiplicand entry operations. Operation of the main clutch, through the rack drive means hereinbefore described, causes the main racks 35 to differentially advance to positions controlled by various depressed amount keys 43 so as to mechanically represent the value of the multiplier factor set up in the keyboard.

Toward the end of the first 180° of operation of the main clutch, the ear 501 (Fig. 4) of member 491 will cam the lever 492 counter-clockwise causing the pin 495, which is now located over the tail of the bellcrank 717, to likewise rock the latter.

The bellcrank 717 is connected through a link 721 to a multiplier clutch control lever 723, similar in construction and function to the lever 433. Thus, the lever 723 will be rocked counter-clockwise against the action of its spring 725 to cause engagement of the multiplier clutch. A lever 726 similar to lever 492, is pivoted at 724 independently of lever 723 and is urged clockwise by a spring 736. This lever is provided with an elongated slot which guides a pin 727 carried by a link 728 pivotally connected at its forward end to a bellcrank 729. The latter is pivoted at 731 and normally held in its illustrated position by its spring 732 to thereby normally hold the pin 727 in the rear portion of its slot wherein it overlies a tail formed in the clutch control lever 723.

Keyed on the multiplier shaft 10 is member 733 having an ear 734 thereon which is effective just prior to the end of a multiplier clutch cycle to cam the lever 726 counter-clockwise. Normally, the pin 727 is held in its rearmost position and thus, the member 733 will cause lever 726 to force pin 727 to hold the clutch control member 723 away from the periphery of the multiplier clutch as the full-cycle indentation 9a thereof moves past the tip of the clutch control lever. Consequently, the clutch will re-cycle and during each new cycle the machine will multiply the multiplicand by a new multiplier digit.

The above re-cycling of the multiplier clutch will continue until the multiplicand has been multiplied by each significant digit in the multiplier at which time the bellcrank 729 is rocked counter-clockwise, as will be described hereinafter, to position the pin 727 at the forward end of the slot in the lever 726, and in a position overlying the tail of bellcrank 735. The latter is normally held in the position shown by its spring 1736, and is connected by a link 738 to a bail 740 pivoted at 471.

As the multiplier clutch approaches the end of its final cycle, with the pin 727 located at its forward position, the camming member 733 will again rock the lever 726 counter-clockwise but since the clutch control lever 723 is now permitted to engage the full cycle indentation 9a of the clutch, the latter will become automatically disengaged. On the other hand, the bellcrank 735 will be rocked by the pin 727, forcing a bent-over projection 738a on the link 738 to engage the ear 470 of the main clutch control lever 433 (see also Fig. 3) to reengage the latter clutch so as to complete its second phase or second 180° of operation.

As previously described, multiplication is performed by successively multiplying all digits of the multiplicand by the successive significant digits of the multiplier, i. e., by one multiplier digit at a time. Consequently, means are provided for sequentially causing successively higher denominational ones of the racks 35 to control the multiplication process. For this purpose, the latter means is arranged to control the multiplication unit which is not completely disclosed herein. Suffice it to say, however, that the multiplication unit comprises in part a plurality of ordinally arranged plates 744 held together as a unit by transversely extending rods 745 and 746 movable fore and aft in guide slots 747 and 748, respectively, formed in the machine side frames 143.

Figure 6:
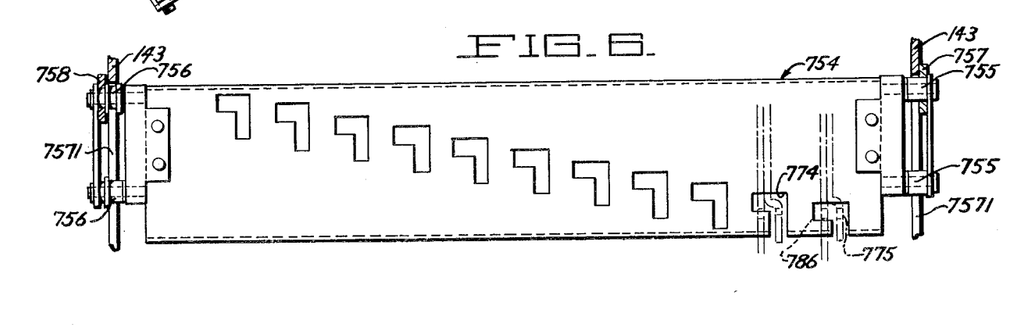
Fig. 6 is a front view of the multiplier digit selection control plate.

Means are provided for sequentially sensing the various racks 35 which have been advanced to represent multiplier digits and to maintain the multiplier clutch in engagement until multiplication by all significant digits of the multiplier has been completed. As shown in Figs. 1 and 6, a vertically shiftable control plate 754 extends across the machine and is mounted on rollers 755 on one side and 756 on the other, said rollers being guided in vertical slots 757! formed in the machine side frames 143.

The plate 754 is guided vertically in parallel movement by yoked arms 757 (Fig. 5) and 758 (Fig. 2) which arms embrace the upper ones of the rollers 755 and 756, respectively. The arms are secured to a rockable shaft 760 to which is also secured an arm 761 urged clockwise by a spring 762 to yieldably force the control plate 754 downwardly.

Two separate devices are provided to normally hold the plate 754 in its raised position in all operations except multiplication. As shown in Fig. 2, a yoked arm 763 is pivoted to one arm of the cam follower 134 and embraces the roller 764 on the arm 761. When the main clutch and its shaft 8 are in full cycle position, the cam follower 134 causes the arm 763 to maintain the plate 754 in its raised position. During the main clutch cycle, the cam follower 134 rocks counter-clockwise, moving the arm 763 to its dot-and-dash line position 763a. It will be recalled that during multiplication, the main shaft 8 will be held in a half-cycle position and the cam follower 134 will therefore allow the plate 754 to be moved downward, if not otherwise restrained.

The second device for retaining the plate 754 in its upper position comprises a latch 765 (Fig. 5) pivoted at 766 and connected to the second factor key operated bellcrank 497 by a link 770. The latch is normally effected to latch a pin 768 on the arm 757, as illustrated.

Upon depression of the multiplier bar 14, the link 770 will rock the latch 765, causing the same to release the arm 757 so that the plate 754 will move downwardly when subsequently permitted to do so by the cam follower 134.

Referring to Fig. 6, it will be noted that the plate 754 is provided with a series of ordinally arranged notches 774 arranged in echelon and in alignment with pairs of sensing and control levers 776 and 780. The path of movement of the vertical leg of each notch is located in alignment with the nose 775 of an associated sensing lever 776. The latter is pivoted at 777 and urged counter-clockwise by a spring 778. Juxtaposed selection control levers 780 are also pivoted at 777 and each is urged counter-clockwise by a spring 788.

All levers 776 and 780 are normally held outward in their positions illustrated in Fig. 1 by a bail 781 operated by a suitable control mechanism (not shown). However, during multiplication operations, the bail 781 is retracted rearward, allowing the levers 776 and 780 in each order to be moved rearward by their respective springs unless otherwise prevented from doing so as will presently appear, causing their noses 775 and 786, respectively, to either engage the side of the control plate 754 or to enter an aligned one of the notches 774. It will be noted that only one set of levers 776 and 780 will be effective to latch the control plate at any one time.

Means are provided for preventing a pair of levers 776 and 780 from blocking downward movement of the plate 754 when the associated rack 35 is in its zero position. An ear 791 is arranged to underlie a nose 790 on the associated lever 780 when the rack is located in its zero position illustrated in Fig. 1. If a rack 35 is not advanced from its zero position, the associated selecting lever 780 will be held outward against the action of its spring 788 and the latter, in turn, will hold the associated sensing lever 776 outward by virtue of an ear 792 thereon overlying the lever 780. The plate 754 in conjunction with pairs of levers 776 and 780 forms the means for sequentially causing the different racks 35 to control the multiplying operation. For this purpose, levers 776 and 780 are provided with pear shaped slots 793 and 794, respectively, through both of which (in each order) projects a pin 795 mounted on the lower end of a cam link 796. The upper end of the link carries a camming pin 797 extending into and movable along a vertical guide slot 798 in an associated aforementioned plate 744. Also, the pin 797 extends into a triangular camming aperture 800 in the associated rack 35.

The pin 795 at the lower end of each link 796 extends into a substantially arcuate slot 801 formed in a juxtaposed lever 802 which is securely fastened to a rockable shaft 803, there being a lever 802 in each order of the machine. The slot 801 is provided with a shoulder 804 toward which the pin 795 is urged by spring 805. The spring 805 is also effective to normally maintain the link 796 in its illustrated raised position. However, the slot 794 in the lever 780 normally prevents the pin 795 from moving to a position under the shoulder 804 unless the two associated levers 776 and 780 are allowed to rock into their blocking positions relative to the plate 754.

The shaft 803 and arms 802 are oscillated once during each multiplying cycle. Therefore, when any set of levers 776 and 780 has moved into locking relation with the plate 754, the associated pin 795 will have been positioned by its spring 805 below the shoulder 804 of the associated lever 802, and during the ensuing oscillation of the shaft 803 the link 796 will be drawn downwardly causing the pin 797 to cam along the engaging surface of the triangular aperture 800, thereby moving the carriage formed by the various aforementioned plates 744 lengthwise to a new position corresponding to that of the associated rack 35.

Toward the end of the downward stroke of a lever 802 which is driving an associated camming link 796, the pin 795 thereon will cam along the forward edges of the slots 793 and 794 in the associated levers, drawing the latter levers out of blocking relation to the plate 754 so that the latter will be free to move downward until blocked by the levers of the next higher order which contains a significant multiplier digit.

Referring to Fig. 2, the shaft 803 has an arm 810 thereon connected by a link 811 to a cam follower 812 pivoted at 813. The latter is provided with a roller 815 held against the periphery of a cam 816 on the multiplier shaft 10 by a spring 814.

It will be seen from the foregoing that the plate 754 will progress downwardly, step by step, as the multiplication operation ensues and will progressively advance the shaft 760 clockwise accordingly. Attached to the shaft 760 is an arm 1080 which, when the plate 754 moves to its lowermost position, will engage the aforementioned bellcrank 729, rocking the same counter-clockwise to position the link 728 and pin 727 in a forward position which, as described hereinbefore, will effect termination of operation of the multiplier clutch 9 at the end of its current cycle and will cause re-engagement of the main clutch to complete its second phase of operation.

Automatic clearance of multiplicand

The multiplicand racks 40 which are set to represent the multiplicand factor during a multiplication are normally automatically cleared or returned to their upper positions during the second phase or 180° of rotation of the main clutch in a multiplication operation.

Referring to Fig. 8, a lever 1012 is supported at 493 and lies adjacent the aforementioned bellcrank 497 whereby upon depression of the multiplier bar 14, the bellcrank will rock the lever 1012 clockwise. This lever is connected to one end of a link 1014 having a slot at its opposite end guided over a pin 1015 mounted on a lever 1016, which for the present purpose may be considered as fixed in the position shown. In such position of the lever 1016, the right end of the link 1014 lies in front of the pin 1017 on a link 1018. The latter is guided at its front end by a frame stud 1020 and at its rear end by a slot 1021 (Fig. 9) in a lever 1022, in which slot a stud 1023 on the link is mounted. The lever 1022 is pivoted at 692 and is connected by a pin and slot connection 1024 to a vertically movable guide rack 1025 (see also Fig. 12). The latter has slots therein guided over frame studs 1026 and 1027 and has a rack gear section thereon in continual mesh with a gear 1028 fixed on the pinion shaft 702.

On depression of the multiplier bar 14, the link 1018 will be actuated rearwardly by link 1014, positioning the stud 1023, which normally lies solely within the slot 1021, within the second shorter slot 1030a in a cam follower 1030. The latter is pivoted at 692 and is urged counter-clockwise by a spring 1029 to hold a roller 1031 thereon against the periphery of a cam 1032 keyed on the main shaft 8.

Figure 16:
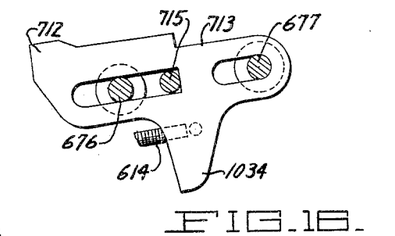

Also, during rearward movement of the link 1018 a pin 1033 thereon engages a shoulder 1034 on the slide 713 (see also Fig. 16) to move the latter rearward so as to retract its cam lobe 712 from under the lock bail roller 710, thus leaving the lobe 711 of slide 687 to solely maintain the lock bail 707 in detenting position.

Now, during the second phase of the main clutch cycle during a multiplication operation, the cams 695 and 696 (Fig. 10) will actuate the cam follower 691 to retract the slide 687 permitting the spring 709 (Fig. 9) to release the lock bail 707 from detenting position. Shortly thereafter, the cam 1032 will rock the cam follower 1030 and since the latter is now coupled to the lever 1022 by the stud 1023, the lever will raise the rack 1025 to rotate the gear 1028 and shaft 702 counter-clockwise, it being recalled that the shaft is now located in its upper position illustrated in Fig. 9 and is retained in that position except during entry of the multiplicand factor.

Referring to Fig. 12 in particular, the shaft 702 is provided with a long key 1036 fitted in a longitudinally extending keyway therein. The key has ordinally arranged drive sections and intermediate sections, the latter of which have their outer surfaces extending coextensive with the periphery of the shaft 702. The various pinions 703 are guided longitudinally by the drive sections, and each pinion has a tooth 1037 thereon, on one side thereof, which, when the associated rack 40 is in an upper home position, as shown in Fig. 1, rests in contact with an adjacent drive portion of the key 1036.

During entry of the multiplicand, the pinions will have been rotated by the main racks 35, relative to the shaft 702, causing the teeth 1037 to recede from the key 1036 so that, during the major portion of the multiplication, the key 1036 will be located at different angular positions relative to the pinions, depending upon the value of the different digits of the multiplicand.

Now, during the latter half of the second phase of the main clutch cycle (near the completion of a multiplication operation), the shaft 702 will be rotated counter-clockwise, as viewed in Fig. 9, by the rack 1025, causing the key 1036 to pick up the various pinions 703 by their respective teeth 1037 to return the pinions and their respective racks 40 and contact elements 654 to their home positions.

Upon return of the cam follower 691 (Figs. 10 and 17) to home position, the latter will draw the slide 687 rearward to cause the cam lobe 711 thereon to relock the bail 707 in its detenting position. Thereafter, the cam 1032 will permit the spring 1029 to lower the rack 1025, through the elements 1030 and 1022, whereupon the key 1036 will be rotated away from the teeth 1037 of the pinions 703 so that they may subsequently be positioned to represent the digits of a new multiplicand factor.

Constant multiplicand control means

It is frequently desired to use the same multiplicand factor for a series of succeeding multiplication operations, as for example, in interest or tax computations, and in order to obviate the necessity of having the operator set the constant multiplicand in the keyboard for each new multiplication, means are provided to render the automatic first factor clearing mechanism described in the preceding section ineffective. This means is controlled by a "constant first factor" key 31 (Fig. 8). The latter, when depressed, is adapted through means (not shown) to be held depressed until manually released.

Referring to Fig. 8, the key 31 is normally retained in its raised position by a spring 1038 and the stem thereof is pivoted to one end of a lever 1016 fulcrumed at 1040 and provided with the pin 1015, which it will be recalled, supports the right hand end of the actuating link 1014. Thus, depression of the key 31 will raise the link 1014 to a position wherein it will be ineffective to force the link 1018 rearward upon depression of the multiplier bar 14. Therefore, the multiplicand racks 40 will not be automatically returned to their home positions in the manner described in the preceding section at the completion of the current multiplication operation.

Manually controlled clear multiplicand mechanism

Means are provided to enable the operator to clear the multiplicand from the multiplying unit, i. e., to return the contact elements 654 and racks 40 to their home positions, at any desired time. For this purpose, a "clear multiplicand" bar 30 (Fig. 8) is provided which, when depressed, causes a main clutch operation to return the various multiplicand racks 40 (Fig. 1) to their upper home positions.

The bar 30 is normally held in a raised ineffective position by a spring 1040a, and the stem of the bar is connected by a bellcrank 1042, pivoted at 1040, to a link 1043. The forward end of the link is connected through a pin and slot connection to the aforementioned lever 1012 so that upon depression of the bar 30, the lever 1012 will be rocked clockwise, causing the clutch control bar 461 to effect engagement of the main clutch for a complete cycle of operation. Thus, also, depression of the bar 30 will actuate the clutch control bar 461 and, through the link 1014 (providing the bar 31 is in its raised position), actuate the link 1018 to effect restoration of the multiplicand racks 40 to their home positions in the same manner as is effected normally at the completion of a multiplication operation.

Having thus described the invention, what I desire to secure by United States Letters Patent is:

1. In a transmission mechanism, the combination comprising a first toothed member, a second toothed member displaced laterally from said first toothed member and having one portion of the teeth thereof in lateral alignment with a portion of the teeth of said first member and another portion of the teeth thereof out of lateral alignment with the teeth of said first member, a third rotatable toothed member, and means for rotatably guiding said third rotatable member along the teeth of said second member while in meshing relation therewith and into and out of mesh with the teeth of said first member.

2. In a transmission mechanism, the combination comprising a rotatable gear, a rack gear displaced laterally from said rotatable gear and having a portion of the teeth thereof in alignment with a portion of the teeth of said rotatable gear, an idler gear device having teeth in mesh with the teeth of said rack gear, and means for rolling said idler gear device along said rack gear while in meshing relation therewith to mesh and demesh the teeth thereof with said rotatable gear.

3. In a transmission mechanism, the combination comprising a pair of independently operable rack gears, a rotatable gear in mesh with one of said rack gears, means rotatably supporting said rotatable gear with a portion of the teeth thereof in alignment with the teeth of the other of said rack gears, an idler gear device in mesh with said other of said rack gears, and means for rolling said idler gear device along said other rack gear while in meshing relation therewith and into and out of mesh with said rotatable gear.

4. In a transmission mechanism, the combination comprising a drive gear, a rack gear displaced laterally from said drive gear and having a portion of the teeth thereof in alignment with a portion of the teeth of said drive gear, an idler gear device having teeth in mesh with the teeth of said rack gear, means for rolling said idler gear device along said rack gear while in meshing relation with said rack gear to mesh the teeth of said idler gear device with said drive gear whereby to transmit rotation between said drive gear and said rack gear, and means for rotating said idler gear device independently of said drive gear whereby to move said rack gear independently of said drive gear.

5. In a transmission mechanism, the combination comprising a drive gear, a rack gear displaced laterally from said drive gear and having a portion of the teeth thereof in alignment with a portion of the teeth of said drive gear, an idler gear having teeth in mesh with the teeth of said rack gear, a shaft rotatably supporting said idler gear, means for moving said shaft along said rack gear to roll said idler gear along said rack gear while in meshing relation therewith into mesh with the teeth of said drive gear, a lost motion connection between said shaft and said idler gear, and means for rotating said shaft whereby to cause said idler gear to move said rack gear independently of said drive gear.

6. In a transmission mechanism, the combination comprising a rack gear, a rotatable drive gear therefor, means rotatably supporting said drive gear with a portion of the teeth thereof in alignment with the teeth of said rack gear, an idler gear, a shaft rotatably carrying said idler gear in mesh with said rack gear, means for moving said shaft along the length of said rack gear whereby to roll said idler gear along said rack gear while in meshing relation therewith and into mesh with the teeth of said drive gear, a lost motion connection between said shaft and said idler gear, a second gear fixedly carried by said shaft, a second rack gear in mesh with said second gear, and means for moving said second rack gear whereby to cause said idler gear to move said first mentioned rack gear independently of said drive gear.

7. In a transmission mechanism, the combination comprising a drive gear, a rack gear displaced laterally from said drive gear and having a portion of the teeth thereof in alignment with a portion of the teeth of said drive gear, an idler gear having teeth in mesh with the teeth of said rack gear, a shaft rotatably supporting said idler gear, means for moving said shaft along said rack gear whereby to roll said idler gear along said rack gear while in meshing relation therewith into mesh with the teeth of said drive gear to transmit rotation from said drive gear to said rack gear, means for rotating said drive gear selected amounts whereby to advance said rack gear to selected positions, means on said idler gear forming a shoulder, means on said shaft forming a second shoulder engageable with said first mentioned shoulder, and means for rotating said shaft in a direction to return said rack gear from advanced position.

8. In a calculating machine, the combination with a computing unit including a gear member settable in different positions to enter digits of different values, respectively, into said unit; of a drive gear displaced laterally of said gear member and having a portion of the teeth thereof in alignment with a portion of the teeth of said gear member, an idler gear having teeth in mesh with the teeth of said gear member, means for rolling said idler gear along the teeth of said gear member while in meshing relation therewith from a position out of mesh with said drive gear to a position in mesh therewith whereby to transmit motion from said drive gear to said gear member, and means for differentially advancing said drive gear whereby to cause said gear member to enter selected digits into said unit.

9. In a calculating machine, the combination with a computing unit including a gear member settable in different positions to enter digits of different values, respectively, into said unit; of a drive gear displaced laterally of said gear member and having a portion of the teeth thereof in alignment with a portion of the teeth of said gear member, an idler gear having teeth in mesh with the teeth of said gear member, means for rolling said idler gear along the teeth of said gear member while in meshing relation therewith from a position out of mesh with said drive gear to a position in mesh therewith whereby to transmit motion from said drive gear to said gear member, means for differentially advancing said drive gear, and power means for operating said last two mentioned means in sequence.

10. In a calculating machine, the combination with a computing unit including a rack gear member settable into different positions to enter digits of different values, respectively, into said unit; of a drive gear displaced laterally of said gear member and having a portion of said teeth thereof in alignment with a portion of the teeth of said gear member, an idler gear having teeth in mesh with the teeth of said gear member, a device normally locking said gear member in any of said positions thereof, means for rolling said idler gear along said gear member while in meshing relation therewith from a position out of mesh with said drive gear to a position in mesh therewith whereby to transmit motion from said drive gear to said gear member, means for thereafter releasing said locking device, and means for thereafter differentially advancing said drive gear.

11. In a calculating machine, the combination with a computing unit including a gear member settable into different positions to enter digits of different values, respectively, into said unit; of a drive gear displaced laterally of said gear member and having a portion of the teeth thereof in alignment with a portion of the teeth of said gear member, an idler gear having teeth in mesh with the teeth of said gear member, a locking device for locking said gear member in any of said positions thereof, a pair of retainers for retaining said locking device in locking position, power drive means for releasing one of said retainers, means for rolling said idler gear along said gear member while in meshing relation therewith from a position out of mesh with said idler gear to a position in mesh therewith, manually manipulatable means for causing operation of said power drive means and said last mentioned means, and means operable by said manually manipulated means for releasing the other of said retainers.

12. In a calculating machine, the combination with a computing unit including a rack gear settable in different positions to enter digits of different values, respectively, into said unit; a drive gear, means for differentially advancing said drive gear, means for selectively transmitting motion between said drive gear and said rack gear comprising an idler gear in mesh with said rack gear, a locking device for locking said rack gear in any of said positions thereof, a pair of retainers for retaining said locking device in locking position, power drive means for releasing one of said retainers and for rolling said idler gear along said rack gear while in meshing relation therewith from a position out of mesh with said drive gear to a position in mesh therewith, and manually manipulatable means for causing operation of said power means and for releasing the other of said retainers.

13. In a calculating machine, the combination with a computing unit including a rack gear settable in different positions to enter digits of different values, respectively, into said unit; of a drive gear, means for differentially advancing said drive gear, means for selectively transmitting motion between said drive gear and said rack gear comprising an idler gear in mesh with said rack gear; a locking device for locking said rack gear in any of said positions thereof, a pair of retainers adapted to retain said locking device in locking position, a reciprocal driving slide operable to release one of said retainers, means for reciprocating said slide, a driven slide, means operatively connecting said driven slide with said idler gear and adapted to roll said idler gear along said rack gear while in meshing relation therewith from a position out of mesh with said drive gear to a position in mesh therewith whereby to transmit movement between said drive gear and said rack gear, a depressible key, and means operable by said key upon depression thereof for releasing the other of said retainers and for coupling said driven slide to said driving slide.

14. In a calculating machine, the combination with a computing unit including a rack gear settable in different positions to enter digits of different values, respectively, into said unit; of a drive gear, means for differentially advancing said drive gear, means for selectively transmitting motion between said drive gear and said rack gear whereby to advance said rack gear, said last mentioned means comprising an idler gear; a shaft rotatably carrying said idler gear in mesh with said rack gear, means on said idler gear forming a shoulder, means on said shaft forming a second shoulder engageable with said first mentioned shoulder, means for moving said shaft along the length of said rack gear whereby to roll said idler gear along said rack gear while in meshing relation therewith from a position out of mesh with said drive gear to a position in mesh therewith, a depressible key, means controlled by said key upon depression thereof for causing sequential operation of said shaft moving means and said differential advancing means, a gear fixedly carried by said shaft, a second rack gear in mesh with said last mentioned gear, a second depressible key, and means controlled by said second key upon depression thereof for moving said second rack gear whereby to rotate said shaft and said idler gear to return said first mentioned rack gear.

EDWARD P. DRAKE.

REFERENCES CITED

The following references are of record in the file of this patent:

UNITED STATES PATENTS

| Number | Name | Date |
|---|---|---|
| 888,555 | Uebbing et al. | May 26, 1908 |
| 982,606 | Kingsbury | Jan. 24, 1911 |
| 1,450,003 | MacKenzie | Mar. 27, 1925 |
| 1,979,387 | Hogfors | Nov. 6, 1934 |
| 2,175,086 | Mitchell | Oct. 3, 1939 |
| 2,280,920 | Landsiedel | Apr. 28, 1942 |
| 2,399,170 | Chase | Apr. 30, 1946 |